(12) United States Patent
Kojima et al.

(10) Patent No.: US 10,882,393 B2
(45) Date of Patent: Jan. 5, 2021

(54) FUEL SUPPLY DEVICE

(71) Applicant: Toyota Jidosha Kabushiki Kaisha, Toyota (JP)

(72) Inventors: Koji Kojima, Toyota (JP); Takanori Sakai, Toyota (JP); Yoshihiro Ito, Toyota (JP); Kazuhiro Tashiro, Toyota (JP); Shinji Shimokawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 25 days.

(21) Appl. No.: 16/296,737

(22) Filed: Mar. 8, 2019

(65) Prior Publication Data

US 2019/0275881 A1 Sep. 12, 2019

(30) Foreign Application Priority Data

Mar. 9, 2018 (JP) .................... 2018-042580

(51) Int. Cl.
*B60K 15/03* (2006.01)
*F16K 15/02* (2006.01)
*F16K 15/06* (2006.01)
*B60K 15/035* (2006.01)
*F02M 37/00* (2006.01)

(52) U.S. Cl.
CPC ...... *B60K 15/035* (2013.01); *B60K 15/03519* (2013.01); *F16K 15/026* (2013.01); *F16K 15/063* (2013.01); *B60K 2015/03296* (2013.01); *B60K 2015/03538* (2013.01); *B60K 2015/03552* (2013.01); *B60K 2015/03585* (2013.01); *F02M 37/0076* (2013.01)

(58) Field of Classification Search
CPC .... F16K 15/026; F16K 15/025; F16K 15/063; F16K 15/06; B60K 15/035; B60K 15/03519; B60K 15/04; B60K 15/03
USPC ............ 220/86.2, 86.1, 562, 203.22, 203.19, 220/203.27, 203.23; 137/199, 140
See application file for complete search history.

(56) References Cited

U.S. PATENT DOCUMENTS

| | | | |
|---|---|---|---|
| 4,953,588 A * | 9/1990 | Sands | F16K 15/063 137/512.3 |
| 2006/0157117 A1 | 7/2006 | Scott | |
| 2006/0196557 A1* | 9/2006 | Niki | F16K 27/0209 137/543.23 |
| 2012/0055454 A1 | 3/2012 | Olateru et al. | |

(Continued)

FOREIGN PATENT DOCUMENTS

| | | |
|---|---|---|
| JP | H05301530 A | 11/1993 |
| JP | 2006-138260 A | 6/2006 |
| JP | 2009-079753 A | 4/2009 |

*Primary Examiner* — Robert J Hicks
(74) *Attorney, Agent, or Firm* — Dinsmore & Shohl LLP

(57) ABSTRACT

A fuel supply device includes a valve body and a filter unit accommodating an air filter and a valve cap are attached to a tubular portion provided on a side surface of an inlet pipe. When a fuel tank has a negative pressure, the valve body opens and the negative pressure is eliminated by clean atmospheric air introduction. A projection portion is provided on the filter unit side of the valve body. Accordingly, attachment of the valve body into the tubular portion and attachment of the tubular portion and the filter unit are reliably performed, the reliability of valve body opening and closing is improved, and attachment workability is improved.

4 Claims, 5 Drawing Sheets

(56) References Cited

U.S. PATENT DOCUMENTS

| | | | |
|---|---|---|---|
| 2016/0129779 A1* | 5/2016 | Shimokawa | B60K 15/03519 137/587 |
| 2016/0201817 A1* | 7/2016 | Koukan | F16K 24/044 137/15.08 |
| 2016/0263991 A1* | 9/2016 | Koukan | F01N 3/2066 |
| 2019/0152314 A1* | 5/2019 | Sakai | B60K 15/03519 |

* cited by examiner

FUEL SUPPLY DEVICE

CROSS-REFERENCE TO RELATED APPLICATION

This application is based upon and claims the benefit of priority from Japanese Patent Application No. 2018-42580, filed on Mar. 9, 2018, the entire contents of which are incorporated herein by reference.

BACKGROUND

(1) Technical Field

The present disclosure relates to a fuel supply device. In a case where the pressure in a fuel tank is lowered, the fuel supply device allows atmospheric air to flow in by opening a valve body in a tubular portion attached to an inlet pipe.

(2) Description of Related Art

In a case where the pressure in an automobile fuel tank is lowered, a decrease in intra-fuel tank pressure needs to be eliminated by atmospheric air inflow into the fuel tank. Proposed to that end is a technique for eliminating a decrease in intra-fuel tank pressure by providing a negative pressure valve at a fuel cap attached to a filler neck and allowing atmospheric air to flow into the fuel tank when the pressure of the fuel tank falls (see JP 5-301530 A).

Incidentally, the technique disclosed in JP 5-301530 A is provided with two dust-storing recessed portions, which result from bending of the air flow path in the fuel cap, so that dust contained in the atmosphere does not enter the fuel tank. However, the dust contained in the atmosphere adheres not only to the dust-storing recessed portions but also to the negative pressure valve, which may lead to an impaired valve function.

In this regard, the problem mentioned above may be addressed by the operational reliability of a valve body 20 being improved. As illustrated in FIG. 5, provided in this case are an inlet pipe 12 reaching a fuel tank from a fuel supply port, a tubular portion 15 provided on the inlet pipe 12, the valve body 20 attached to the inside of the tubular portion 15 and opening when the pressure in the fuel tank becomes negative, and a filter unit 30 accommodating an air filter 33 attached to the tubular portion 15 provided on the inlet pipe 12.

However, in attaching the valve body 20 to the tubular portion 15 protruding from the inlet pipe 12, it may be necessary to insert the valve body 20 to which a spring member 18 is attached in advance into the thin tubular portion 15. In addition, the valve body 20 is not stable even after the attachment. Besides, in a case where the filter unit 30 that has the air filter 33 is subsequently attached, it may be necessary to attach the filter unit 30 while pressing the valve body 20, which results in poor workability.

Further, attachment of the filter unit 30 to the tubular portion 15 is performed without the valve body 20 visible, and thus the attachment is not free from concerns over reliability. In a case where the filter unit 30 is fixed to the tubular portion 15 by welding, in particular, the tubular portion 15 and the filter unit 30 are not positioned with ease.

SUMMARY

An object of the present disclosure is to provide a fuel supply device with which valve body insertion into a tubular portion and filter unit attachment and fixing can be performed with ease and reliability.

In order to solve the above problem, the present disclosure provides a fuel supply device including an inlet pipe reaching a fuel tank from a fuel supply port, a tubular portion provided on a side surface of the inlet pipe and protruding from the inlet pipe, a hole portion provided in a bottom surface of the tubular portion and capable of introducing atmospheric air into the inlet pipe, a valve body attachment portion provided on the bottom surface of the tubular portion, a filter unit attached to the tubular portion and including an air filter, an atmospheric air introduction port, and a valve cap abutting against a valve body, the valve body attached to the valve body attachment portion and opening from the valve cap when a pressure in the fuel tank becomes negative, and a projection portion protruding in the valve cap direction on the valve cap side of the valve body.

The present disclosure includes an inlet pipe reaching a fuel tank from a fuel supply port, a tubular portion provided on a side surface of the inlet pipe and protruding from the inlet pipe, a hole portion provided in a bottom surface of the tubular portion and capable of introducing atmospheric air into the inlet pipe, a valve body attachment portion provided on the bottom surface of the tubular portion, a filter unit attached to the tubular portion and including an air filter, an atmospheric air introduction port, and a valve cap abutting against a valve body, and the valve body attached to the valve body attachment portion and opening from the valve cap when a pressure in the fuel tank becomes negative. Accordingly, it is possible to eliminate the negative pressure in the fuel tank by introducing atmospheric air from the hole portion of the tubular portion protruding from the inlet pipe when the pressure in the fuel tank becomes negative.

In addition, the present disclosure includes a filter unit attached to the tubular portion and including an air filter, an atmospheric air introduction port, and a valve cap abutting against a valve body. Accordingly, it is possible to block dust contained in the atmosphere from passing forward through the air filter and to ensure airtightness between the valve cap and the valve body.

Further, the present disclosure includes a projection portion protruding in the valve cap direction on the valve cap side of the valve body. Accordingly, the projection portion of the valve body serves as a handle when the valve body is attached to the valve body attachment portion, and the reliability and workability of the attachment are improved.

The present disclosure provides the fuel supply device in which the projection portion of the valve body has a shape in which a tubular frustum shape is divided from a base part of the valve body toward the valve cap direction.

In the present disclosure, the projection portion of the valve body has a shape in which a tubular frustum shape is divided from a base part of the valve body toward the valve cap direction. Accordingly, in a case where the projection portion is used as a handle during valve body attachment to the valve body attachment portion, the projection portion can be reliably gripped with each divided part having some elasticity based on the divided shape. The projection portion has a base expanded toward the valve body. Accordingly, during filter unit attachment to the tubular portion, returning to a normal position is possible even if the positions of the valve body and the valve cap are slightly misaligned.

The present disclosure provides the fuel supply device in which the base part between the projection portion and the valve body has an outer shape slightly smaller than an inner shape of the valve cap.

In the present disclosure, the base part between the projection portion and the valve body has an outer shape slightly smaller than an inner shape of the valve cap. Accordingly, the projection portion serves as a guide attaching the valve cap of the filter unit onto the valve body, and the reliability and workability of the attachment are improved.

Incidentally, in a case where the valve cap is a tubular column and the projection portion has a shape in which a tubular truncated cone is divided, the inner shape of the valve cap is the inner diameter of the tubular column and the outer shape of the base part between the projection portion and the valve body is the outer diameter of the bottom surface of the tubular truncated cone.

The present disclosure provides the fuel supply device in which the projection portion of the valve body extends beyond the valve cap when the valve body is attached to the filter unit and a key-shaped portion protruding in the valve cap side direction is provided at a tip part of the projection portion.

In the present disclosure, the projection portion of the valve body extends beyond the valve cap when the valve body is attached to the filter unit and a key-shaped portion protruding in the valve cap side direction is provided at a tip part of the projection portion. Accordingly, when the projection portion passes through the valve cap, the projection portion bends inwards due to the presence of the key-shaped portion and the projection portion passes in contact with the valve cap. As a result, the reliability of valve body attachment increases.

Once the key-shaped portion finishes passing through the valve cap of the filter unit, the deflection of the projection portion is eliminated and a "click" sound is generated during the return to the original shape, and thus it is possible to confirm that the valve body is reliably attached to the valve cap.

In the event of a negative intra-fuel tank pressure, the valve body opens and atmospheric air flows into the fuel tank through the air filter and the valve body. At this time, dust in the atmosphere is removed by the air filter, and thus a valve body operation failure attributable to atmospheric dust being stuck can be prevented.

The projection portion of the valve body serves as a handle of the valve body during attachment to the valve body attachment portion and a guide attaching the valve cap of the filter unit onto the valve body. Accordingly, the reliability and workability of the attachment are improved. Further, once the key-shaped portion finishes passing through the valve cap of the filter unit, the deflection of the projection portion is eliminated and a "click" sound is generated during the return to the original shape, and thus it is possible to confirm that the projection portion is reliably attached to the valve cap.

DETAILED DESCRIPTION

The present disclosure relates to a fuel supply device. In a case where the pressure in a fuel tank is lowered, the fuel supply device allows atmospheric air to flow in by opening a valve body in a tubular portion attached to an inlet pipe. The fuel supply device according to the present disclosure improves the workability and reliability of valve body attachment.

Figure 1:
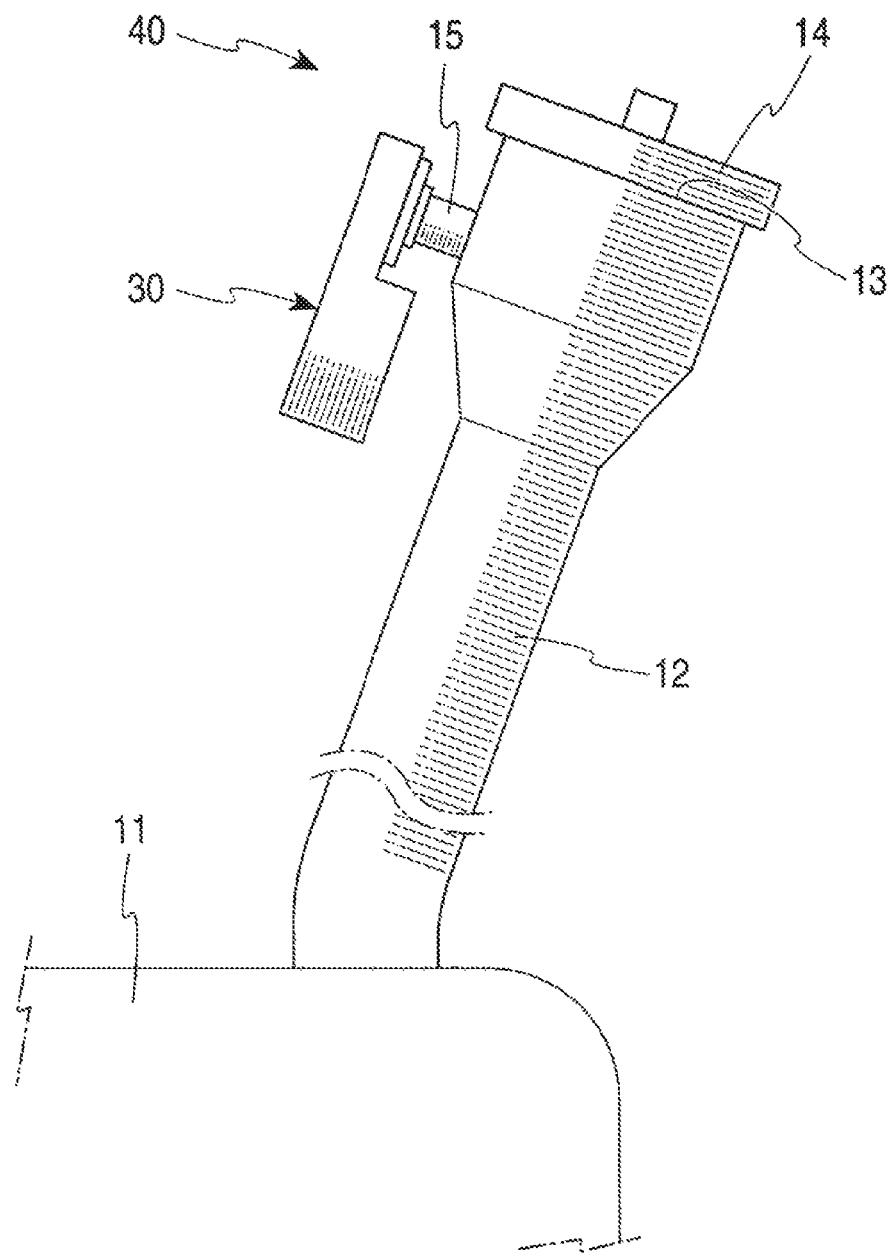
FIG. 1 is a front view of a fuel supply device according to a first embodiment of the present disclosure.
Figure 2:
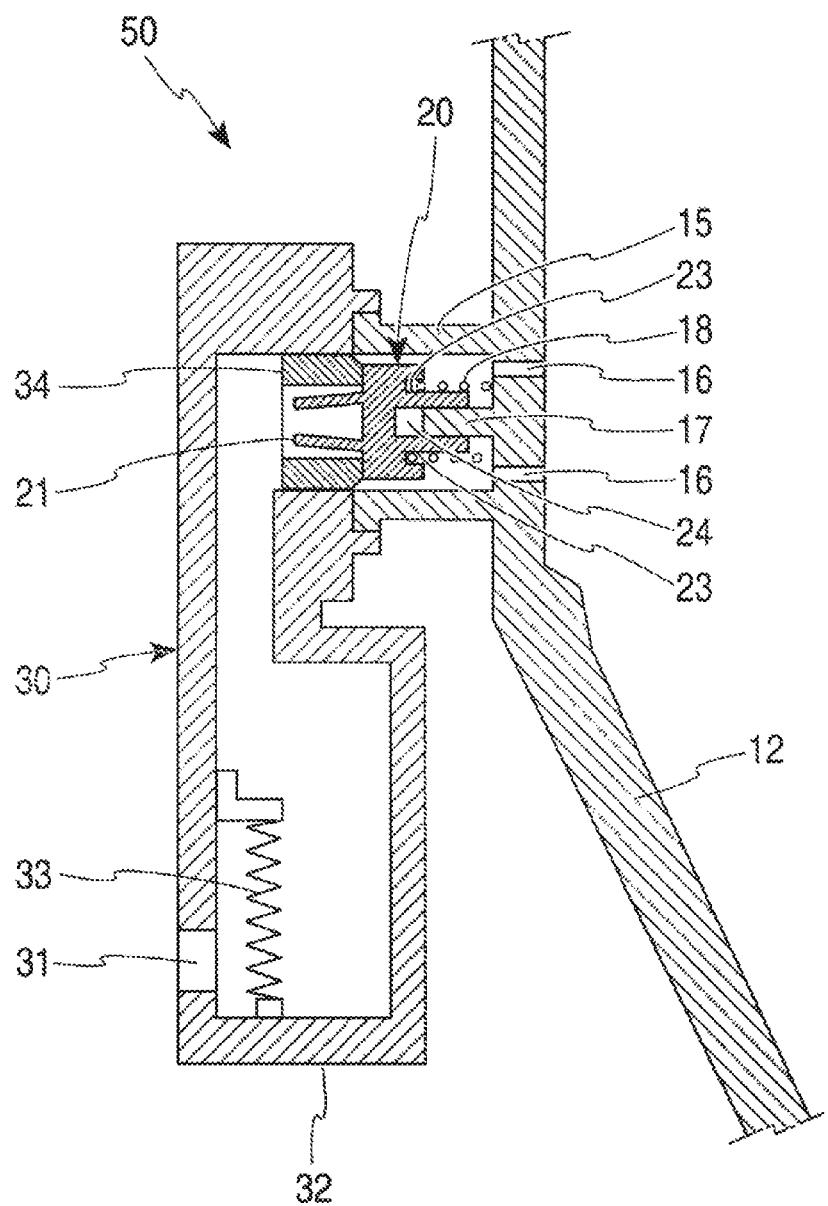
FIG. 2 is a front cross-sectional view of a valve module according to the first embodiment of the present disclosure.

FIG. 1 is a front view of a fuel supply device 40 according to a first embodiment of the present disclosure. FIG. 2 is a front cross-sectional view of a valve module 50. The fuel supply device 40 of the first embodiment is provided with a fuel tank 11, an inlet pipe 12 supplying a fuel to the fuel tank 11, a fuel cap 14 opening and closing a fuel supply port 13 of the inlet pipe 12, a tubular portion 15 provided in the vicinity of the fuel supply port 13 of the inlet pipe 12, a valve body 20 disposed in the tubular portion 15, and a filter unit 30 attached to the tubular portion 15. Incidentally, the valve module 50 is a generic term for a part in which the tubular portion 15 of the inlet pipe 12, the valve body 20 disposed in the tubular portion 15, and the filter unit 30 attached to the tubular portion 15 are combined. In the present embodiment, the inlet pipe 12, the tubular portion 15, a filter housing 32, a valve cap 34, the valve body 20, and a projection portion 21 are resinous without exception. The tubular portion 15, the valve cap 34, and the valve body 20 have a cylindrical shape.

As illustrated in FIG. 2, the tubular portion 15 provided on the side surface of the inlet pipe 12 is provided with a hole portion 16 and a valve body attachment portion 17. Atmospheric air supplied from the filter unit 30 when the valve body 20 is open is allowed to flow into the inlet pipe 12 through the hole portion 16. A spring member 18 and the valve body 20 controlling the inflow of the atmospheric air are attached to the valve body attachment portion 17.

Provided on the inlet pipe 12 side of the valve body 20 are a spring member attachment groove 23 attaching the spring member 18 and a valve body attachment groove 24 attaching the valve body 20 to which the spring member 18 is attached to the valve body attachment portion 17 of the tubular portion 15. The projection portion 21 is provided on the surface of the valve body 20 that is opposite to the valve body attachment groove 24. The projection portion 21 is inclined inwards in a direction away from the valve body 20.

The filter housing 32, an air filter 33, and the valve cap 34 constitute the filter unit 30. An atmospheric air introduction port 31 is provided in the filter housing 32 and at a position farthest from the valve cap 34. The bellows-shaped air filter 33 is accommodated on the downstream side of the introduction port 31 of the filter housing 32.

The valve cap 34 pressing the valve body 20 to the inlet pipe 12 side is disposed on the side of the tubular portion 15 of the inlet pipe 12 of the filter housing 32. The filter housing 32 and the valve cap 34 are integrated by welding.

The side of the valve cap 34 on which the valve cap 34 abuts against the valve body 20 is attached to the filter housing 32 so as to protrude from the filter housing 32. This is for the valve cap 34 to press the valve body 20 and for the valve cap 34 and the valve body 20 to reliably abut against each other when the filter unit 30 is subsequently attached to the tubular portion 15.

As a result, the valve cap 34 and the valve body 20 normally abut against each other. In that state, the atmospheric air in the filter housing 32 is completely blocked by the valve body 20, and the atmospheric air does not pass through the valve body 20 and leak into the inlet pipe 12 from the hole portion 16.

Figure 3:
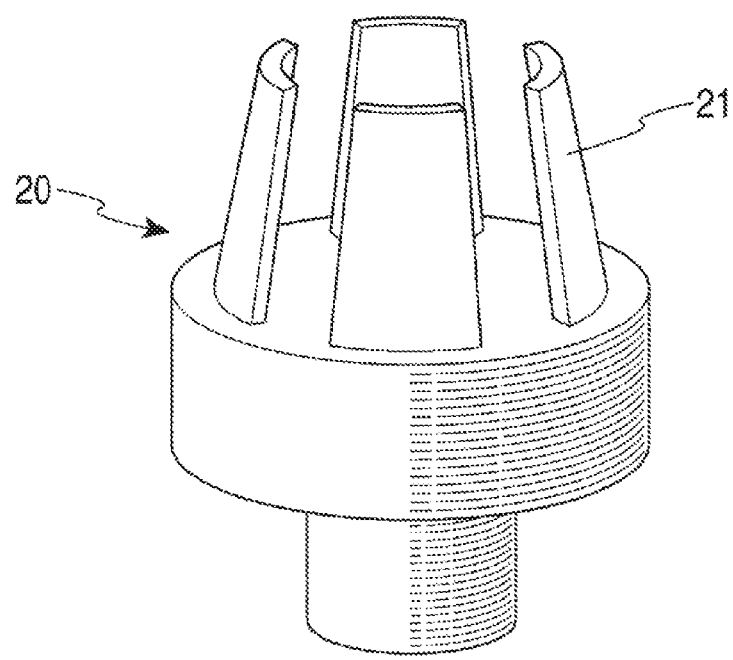
FIG. 3 is a perspective view of a valve body used for the fuel supply device according to the first embodiment of the present disclosure.

As illustrated in FIG. 3, the projection portion 21 is provided on the side of the valve body 20 on which the valve body 20 abuts against the valve cap 34. The projection portion 21 has a shape in which a tubular truncated cone is divided into four. The projection portion 21 has a tubular frustum shape, a truncated cone shape in the present embodiment, and thus the projection portion 21 is light enough. Accordingly, when the fuel tank 11 has a negative pressure, the valve body 20 operates reliably against urging of the spring member 18. In addition, the divided shape allows the projection portion to be reliably gripped.

Although the projection portion 21 has a shape in which a tubular truncated cone is divided into four in the present embodiment, the division is not limited to division into four. In addition, the shapes of the divided parts of the projection portion 21 may be identical or different. Although the projection portion 21 may have a uniform thickness, it is desirable, in view of the strength of the base part between the projection portion 21 and the valve body 20 and weight reduction for the projection portion 21, that the projection portion 21 is thick at the base part between the projection portion 21 and the valve body 20 and the thickness of the projection portion 21 decreases as the diameter of the projection portion 21 decreases.

It is desirable that the diameters of the upper surface and the bottom surface of the tubular truncated cone-shaped projection portion 21 have little difference considering that the projection portion 21 serves as a handle during attachment of the valve body 20 and a guide during attachment of the valve cap 34. Desirably, the angle that is formed by the bottom surface and the side surface of the truncated cone is 60 degrees or more and 85 degrees or less. Desirably, the height of the projection portion 21 is 10 mm or more considering that the projection portion 21 serves as a handle during attachment of the valve body 20 and the valve body 20 is attached to the tubular portion 15.

Regarding the diameter of the bottom surface of the tubular truncated cone-shaped projection portion 21, it is desirable that the outer diameter of the bottom surface of the truncated cone is slightly smaller than the inner diameter of the tubular cylindrical valve cap 34 considering that the projection portion 21 serves as a guide when the filter unit 30 is attached to the tubular portion 15, that is, when the valve cap 34 is attached onto the valve body 20. In the valve body 20, the outside part of the projection portion 21 abuts against the valve cap 34.

Incidentally, the material of the projection portion 21 may be identical to or different from the material of the valve body 20. The projection portion 21 may be assembled to the valve body 20 by adhesion or welding or the projection portion 21 may be integrally formed with the valve body 20.

The valve module 50 of the present embodiment is assembled as follows. First, the spring member 18 is attached to the spring member attachment groove 23 of the valve body 20, and then the valve body attachment groove 24 is inserted into and attached to the valve body attachment portion 17 formed in the tubular portion 15 of the inlet pipe 12. At this time, the valve body 20 is movable in the leftward-rightward direction on the drawing and is not fixed since the valve body attachment groove 24 is inserted in the valve body attachment portion 17. Incidentally, the projection portion 21 of the valve body 20 serves as a handle when the valve body 20 is attached to the valve body attachment portion 17.

Next, the filter unit 30 in which the air filter 33 is accommodated and the valve cap 34 is integrated by welding is attached to the tubular portion 15 of the inlet pipe 12. At this time, the tip part of the valve cap 34 presses the valve body 20 into the tubular portion 15 and the projection portion 21 of the valve body 20 serves as a guide attaching the valve cap 34 of the filter unit 30 onto the valve body 20.

Finally, the filter unit 30 and the tubular portion 15 of the inlet pipe 12 are integrated by welding.

Accordingly, the projection portion 21 of the valve body 20 serves as a handle of the valve body 20 when the valve body attachment groove 24 is inserted into and attached to the valve body attachment portion 17 and serves as a guide when the valve cap 34 of the filter unit 30 is attached onto the valve body 20. As a result, the reliability and workability of the attachment are improved.

The function of the valve module 50 of the present embodiment is as follows. Normally, in a case where the pressure in the fuel tank 11 is equal to the atmospheric pressure, the valve body 20 is pressed against the valve cap 34 by urging of the spring member 18. In other words, the valve remains closed and the airtightness of the fuel tank 11 and the inlet pipe 12 is maintained.

Once the pressure in the fuel tank 11 dips below the atmospheric pressure, the valve body 20 moves to the inlet pipe 12 side against urging of the spring member 18. Then, the valve opens and the inside of the filter housing 32 and the inlet pipe 12 communicate with each other by the hole portion 16. As a result, the air in the atmosphere is introduced into the filter housing 32 from the introduction port 31 and flows into the fuel tank 11 through the hole portion 16 and the inlet pipe 12.

Although dust floats in the atmosphere, the bellows-shaped air filter 33 is accommodated in the filter housing 32 of the filter unit 30, and thus the air filter 33 allows atmospheric air to pass while blocking passage of the dust in the atmosphere. Subsequently, the valve body 20 closes and returns to its original state once the pressure in the fuel tank 11 becomes equal to the atmospheric pressure. As a result, the dust in the atmosphere does not reach the part where the valve body 20 is present, and no dust is stuck between the valve body 20 and the valve cap 34.

Figure 4:
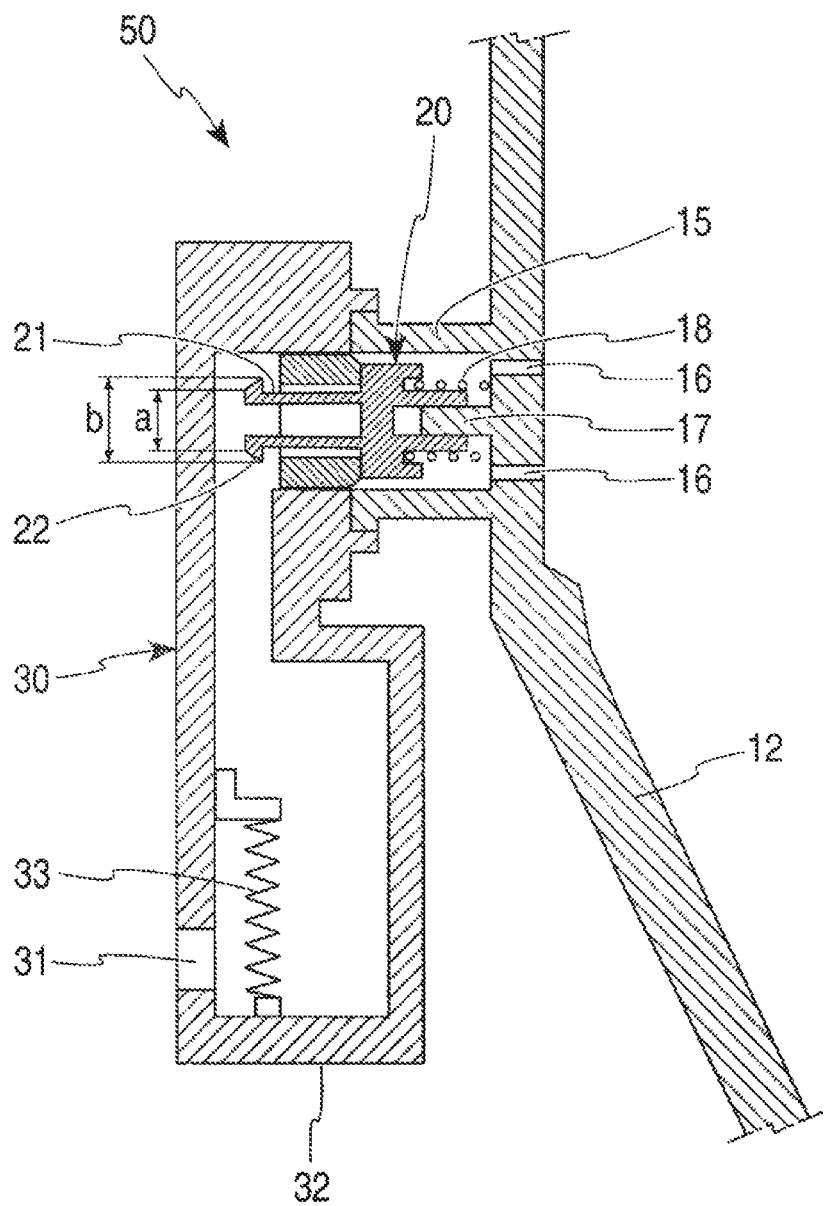
FIG. 4 is a front view of a valve module according to a second embodiment of the present disclosure.
Figure 5:
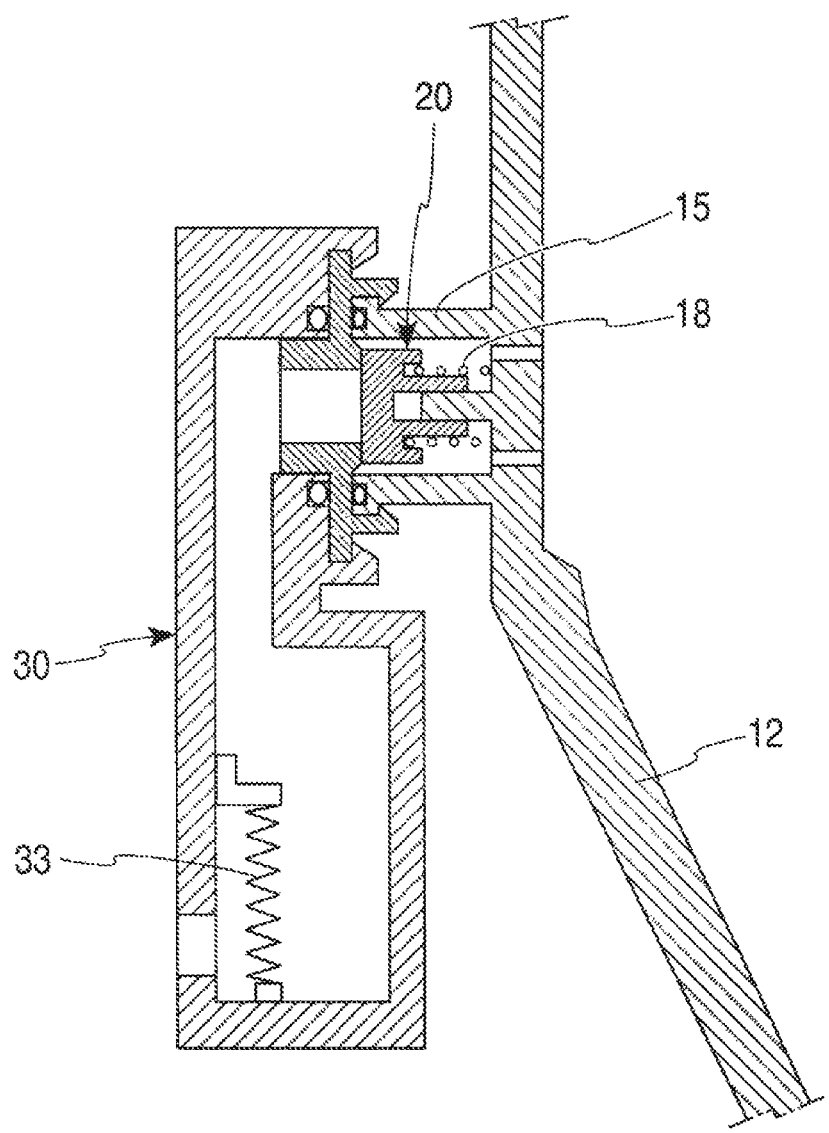
FIG. 5 is a front view of a fuel supply device using a filter unit.

FIG. 4 is a front view of the valve module 50 according to a second embodiment of the present disclosure. The second embodiment differs from the first embodiment in that the projection portion 21 provided in the tubular portion 15 according to the second embodiment extends into the filter housing 32 beyond the valve cap 34 when the valve body 20 is attached to the filter unit 30 and a key-shaped portion 22 is provided on the valve cap 34 side of the tip part of the projection portion 21.

The key-shaped portion 22 has a shape having an inclination with a relationship of a<b. Assuming that the valve cap 34 has an inner diameter of c, the key-shaped portion 22 and the valve cap 34 have a relationship of a<c<b. Because of the above relationship, the tip of the key-shaped portion 22 is capable of entering the valve cap 34 after a relationship of a<c is satisfied first during attachment of the filter unit 30 to the tubular portion 15.

Next, when the key-shaped portion 22 passes through the valve cap 34 after a relationship of c<b is satisfied, the projection portion 21 bends inwards and the key-shaped portion 22 passes through the valve cap 34 with the rear end of the key-shaped portion 22 in contact with the inside of the valve cap 34.

When the rear end of the key-shaped portion 22 finishes passing through the valve cap 34, the deflection of the projection portion 21 is eliminated and the projection portion 21 returns to its original shape. At that time, a "click" sound is generated and it can be confirmed that the key-shaped portion 22 has passed through the valve cap 34.

Incidentally, regarding the projection portion 21, it is desirable that the height from the valve body 20 to the rear end of the key-shaped portion 22 is set to the value that is obtained by adding the height of the valve cap 34 to the distance from the valve body 20 that is closed to the tip of the valve body attachment portion 17 considering that the key-shaped portion 22 passes through the valve cap 34 and the valve opening length of the valve body 20, that is, the distance from the valve body 20 that is closed to the tip of the valve body attachment portion 17.

The valve module 50 of the present embodiment is assembled as follows. First, the spring member 18 is attached to the spring member attachment groove 23 of the valve body 20, and then the valve body attachment groove 24 is inserted into and attached to the valve body attachment portion 17 formed in the tubular portion 15 of the inlet pipe 12. At this time, the valve body 20 is movable in the leftward-rightward direction on the drawing and is not fixed since the valve body attachment groove 24 is inserted in the valve body attachment portion 17. Incidentally, the projection portion 21 or the key-shaped portion 22 of the valve body 20 serves as a handle when the valve body 20 is attached to the valve body attachment portion 17.

Next, the filter unit 30 is attached to the tubular portion 15 of the inlet pipe 12. At this time, the key-shaped portion 22 is present at the tip part of the projection portion 21 of the valve body 20, and thus the projection portion 21 bends inwards as described above and passes through the valve cap 34 of the filter unit 30. When the key-shaped portion 22 finishes passing through the valve cap 34 of the filter unit 30, the deflection of the projection portion 21 is eliminated, the projection portion 21 returns to its original shape, and the projection portion 21 is attached to the valve cap 34. Finally, the filter unit 30 and the tubular portion 15 of the inlet pipe 12 are integrated by welding.

Accordingly, the projection portion 21 or the key-shaped portion 22 of the valve body 20 serves as a handle of the valve body 20 during attachment to the valve body attachment portion 17, the projection portion 21 of the valve body 20 serves as a guide attaching the valve cap 34 of the filter unit 30 onto the valve body 20, and thus the reliability and workability of the attachment are improved. Further, once the key-shaped portion 22 finishes passing through the valve cap 34 of the filter unit 30, the deflection is eliminated and a "click" sound is generated during the return to the original shape, and thus it is possible to confirm that the projection portion 21 is reliably attached inside the valve cap 34.

The implementation of the present disclosure is not limited to the above embodiments, and various modifications are possible without departing from the object of the present disclosure.

Although the projection portion 21 of the valve body 20 that is a tubular truncated cone divided into four is provided on the surface of the valve body 20 where the valve body 20 abuts against the valve cap 34 of the filter unit 30 in the present embodiment, the shape may be replaced with any other shape insofar as the projection portion 21 serves as a handle of the valve body 20 when the valve body 20 is attached to the valve body attachment portion 17 and a guide attaching the valve cap 34 of the filter unit 30 onto the valve body 20.

Conceivable examples include a shape in which a tubular column is placed on the upper surface of a tubular truncated cone.

Although the filter unit 30 and the tubular portion 15 are fixed by welding in the present embodiment, the filter unit 30 and the tubular portion 15 may also be assembled by a locking projection and a sealing member.

What is claimed is:

1. A fuel supply device comprising:
an inlet pipe reaching a fuel tank from a fuel supply port;
a tubular portion provided on a side surface of the inlet pipe and protruding from the inlet pipe;
a hole portion provided in a bottom surface of the tubular portion and capable of introducing atmospheric air into the inlet pipe;
a valve body attachment portion provided on the bottom surface of the tubular portion;
a filter unit attached to the tubular portion and including an air filter, an atmospheric air introduction port, and a valve cap abutting against a valve body;
the valve body attached to the valve body attachment portion and opening from the valve cap when a pressure in the fuel tank becomes negative; and
a projection portion protruding in the valve cap direction on the valve cap side of the valve body.

2. The fuel supply device according to claim 1, wherein the projection portion of the valve body has a shape in which a tubular frustum shape is divided from a base part of the valve body toward the valve cap direction.

3. The fuel supply device according to claim 2, wherein the base part between the projection portion and the valve body has an outer shape slightly smaller than an inner shape of the valve cap.

4. The fuel supply device according to claim 1, wherein the projection portion of the valve body extends beyond the valve cap when the valve body is attached to the filter unit and a key-shaped portion protruding in the valve cap side direction is provided at a tip part of the projection portion.

* * * * *